United States Patent
Alferov et al.

(10) Patent No.: US 8,696,793 B2
(45) Date of Patent: Apr. 15, 2014

(54) GAS LIQUEFACTION AND SEPARATION DEVICE UTILIZING SUBSONIC AND SUPERSONIC NOZZLES

(75) Inventors: Vadim Ivanovich Alferov, Moscow (RU); Lev Arkadievich Bagirov, Moscow (RU); Leonard Makarovich Dmitriev, Zhukovsky (RU); Salavat Zainetdinovich Imaev, Ramenskoe (RU); Vladimir Isaakovich Feygin, Moscow (RU)

(73) Assignee: 3S Gas Technologies Limited, Nicosia (CY)

( * ) Notice: Subject to any disclaimer, the term of this patent is extended or adjusted under 35 U.S.C. 154(b) by 1092 days.

(21) Appl. No.: 12/733,260

(22) PCT Filed: Jul. 31, 2008

(86) PCT No.: PCT/RU2008/000498
§ 371 (c)(1),
(2), (4) Date: Feb. 19, 2010

(87) PCT Pub. No.: WO2009/028987
PCT Pub. Date: Mar. 5, 2009

(65) Prior Publication Data
US 2010/0147023 A1    Jun. 17, 2010

(30) Foreign Application Priority Data

Aug. 22, 2007 (RU) .............................. 2007131786

(51) Int. Cl.
| | |
|---|---|
| *B01D 53/00* | (2006.01) |
| *B01D 59/00* | (2006.01) |
| *B01D 53/24* | (2006.01) |
| *B01D 59/20* | (2006.01) |
| *F04F 5/44* | (2006.01) |
| *B01D 41/00* | (2006.01) |
| *B01D 45/18* | (2006.01) |
| *B01D 46/04* | (2006.01) |
| *F25J 1/00* | (2006.01) |
| *F25J 3/00* | (2006.01) |
| *B01D 5/00* | (2006.01) |

(52) U.S. Cl.
CPC ............... *B01D 53/24* (2013.01); *B01D 53/00* (2013.01); *B01D 53/002* (2013.01); *F25J 1/00* (2013.01); *F25J 3/00* (2013.01); *B01D 5/0045* (2013.01); *B01D 5/0048* (2013.01)
USPC ............ 95/32; 95/29; 95/34; 55/292; 55/468; 62/617; 62/606; 417/196; 417/198

(58) Field of Classification Search
USPC ............ 62/606, 86, 611, 613, 619; 95/29–34; 96/389
See application file for complete search history.

(56) References Cited

U.S. PATENT DOCUMENTS 3,528,217 A * 9/1970 Garrett .............................. 62/86
4,272,499 A * 6/1981 Cason et al. ............. 423/243.08

(Continued)

FOREIGN PATENT DOCUMENTS

| RU | 2 143 654 C1 | 12/1999 |
| RU | 2 167 374 C1 | 5/2001 |

*Primary Examiner* — Frantz Jules
*Assistant Examiner* — Keith Raymond
(74) *Attorney, Agent, or Firm* — Nath, Goldberg & Meyer; Jerald L. Meyer; Lakshmi Rajan

(57) ABSTRACT

The invention relates to cryogenic engineering. The inventive device for liquefying and separating gas and for releasing one or more gases from a mixture thereof, comprises, in series axially positioned, a prechamber (1) with gas flow whirling means (2) arranged therein, a subsonic or supersonic nozzle (3) with a working segment (4), which is abutted thereto and to which liquid phase extracting means (5) is connected, and a subsonic diffuser (7) or the combination of a supersonic (6) and the subsonic diffuser (7). The length of the working segment (4) is selected according to a condition of forming condensate drops with a size greater than 0.5 mkm and of drifting them, by centrifugal forces, from the axial area of the working segment to the walls of the drop extracting means. The device is provided with an additional nozzle (8) arranged in the prechamber. The invention makes it possible to increase the separation efficiency.

8 Claims, 6 Drawing Sheets

(56) References Cited

U.S. PATENT DOCUMENTS

Figure 1:
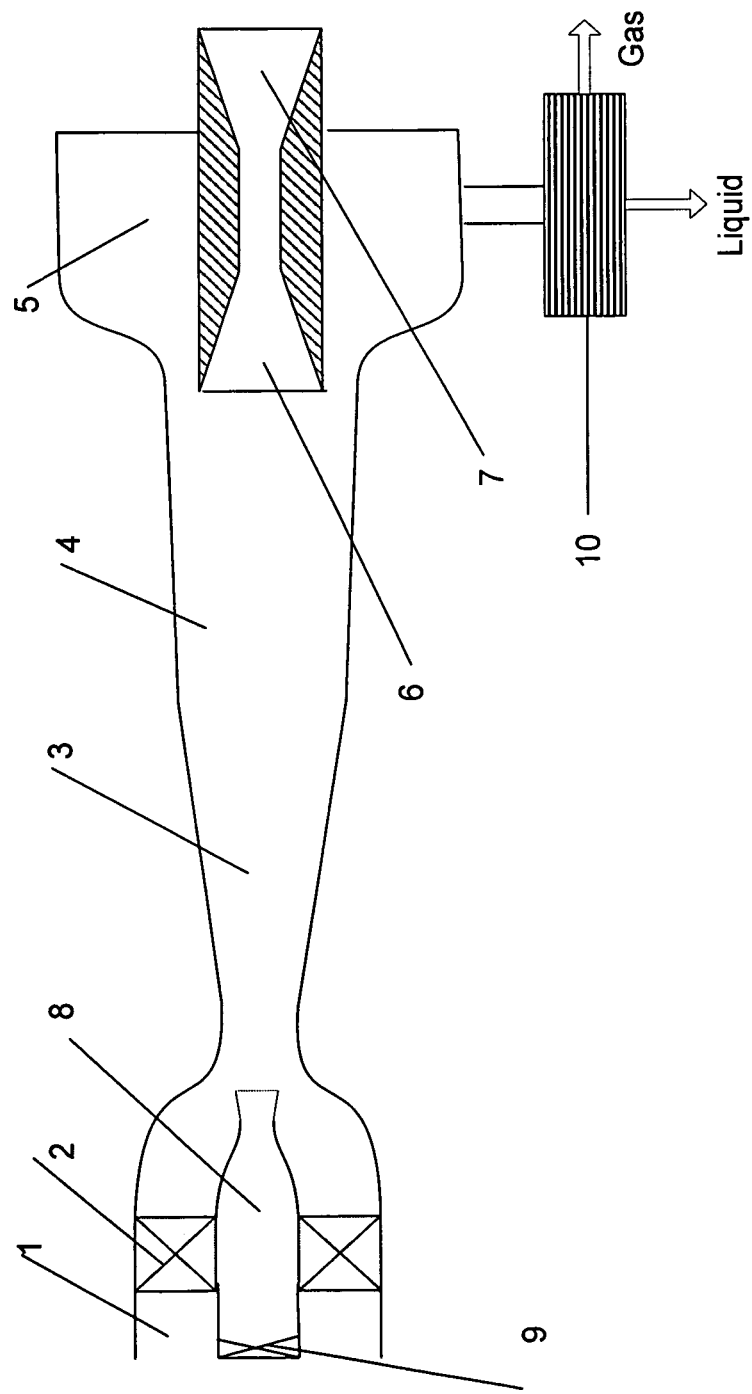

| | | | |
|---|---|---|---|
| 5,087,175 A * | 2/1992 | Raizman et al. | 417/196 |
| 5,275,486 A * | 1/1994 | Fissenko | 366/178.3 |
| 5,306,330 A | 4/1994 | Nasikas | |
| 5,839,884 A * | 11/1998 | Beylich | 417/196 |
| 6,248,154 B1 * | 6/2001 | Popov | 95/156 |
| 6,280,502 B1 * | 8/2001 | van Veen et al. | 95/29 |
| 6,372,019 B1 * | 4/2002 | Alferov et al. | 95/29 |
| 6,776,825 B2 * | 8/2004 | Betting et al. | 96/389 |
| 6,877,960 B1 * | 4/2005 | Presz et al. | 417/198 |
| 6,962,199 B1 * | 11/2005 | Tjeenk Willink | 166/265 |
| 8,002,878 B2 * | 8/2011 | Betting et al. | 95/261 |

* cited by examiner

GAS LIQUEFACTION AND SEPARATION DEVICE UTILIZING SUBSONIC AND SUPERSONIC NOZZLES

This is a National Phase Application filed under 35 U.S.C. 371 as a national stage of PCT/RU2008/000498, filed on Jul. 31, 2008, and claims benefit to Russian Patent Application No. 2007131786, filed on Aug. 22, 2007, the content of which is hereby incorporated by reference in its entirety.

This invention relates to the field of cryogenic engineering and may be used in various industries for producing liquefied gases and separating gas mixture components or separating one or more target components.

A gas liquefaction device is known that comprises a housing in the form of a horn with several attachments successively arranged therein and provided with discs having a plurality of nozzles for adiabatic expansion of a gas and lowering its temperature to a point where a portion of gas changes into a liquid state (see, JP Patent No. 07071871, F 25 J 1/00, 1995). The disadvantage of this device is its relatively low efficiency.

A device for producing liquefied gas is known that comprises a supersonic nozzle employing adiabatic expansion of gas for cooling it and means for separating the liquid phase, which is made as a nozzle area having perforated walls and deflected toward its axis. Droplets of condensed gas pass through perforations and come into a receiver under the influence of centrifugal forces arising when a gas flow is deflected (see, U.S. Pat. No. 3,528,217, US Cl. 55-15, 1970).

A disadvantage of this device is its relatively low efficiency. It is due to the fact that shock waves arise during deflection of a supersonic flow, which deflection is required in the known device for separating the liquid phase, and such shock waves result in a gas flow increased temperature that, in its turn, causes evaporation of some already condensed droplets.

Furthermore, there are losses of full pressure in gas that has passed a shock wave. Such losses result in a significant pressure differential between the inlet and the outlet of a device.

A known gas liquefaction device is described in RU Patent No. 2137065, F 25 J 1/00, 1999. This device comprises a nozzle with a premix chamber having means for swirling a gas flow therein. The device is provided with means for separating the liquid phase, which is made as an annular slot formed by the walls of the nozzle and a hollow cone.

A disadvantage of the known device is its relatively low efficiency that is due to a pressure loss in a gas flow passing through the device.

For example, at M=3.0, where M is the Mach number of a supersonic flow, gas under the pressure of 200 atmospheres is fed to the inlet of the device, and gas leaves the device at the pressure of 50 atmospheres.

A gas liquefaction device, which is the closest to the claimed device as to its technical essence and the achieved technical effect, is known from RU Patent No. 2167374, F25J3/06, 2001. This gas liquefaction device comprises a nozzle with a premix chamber, the latter comprising means for swirling a gas flow, and is provided with a supersonic diffuser and/or a subsonic diffuser, as arranged at the working section outlet, and means for separating the liquid phase that is made as perforations in the nozzle walls and/or an annular slot formed by the nozzle walls and the inlet section of the diffuser. Furthermore, the subsonic diffuser is provided with means for straightening a swirling gas flow, the said means being installed in the subsonic diffuser in a location where the axial flow velocity corresponds to M=0.25-0.45, where M is the Mach number in a given medium. The invention enables to raise gas liquefaction efficiency, which is achieved due to lowering a pressure differential between the inlet and the outlet of the device.

The claimed device is directed to raising efficiency of separating a gas mixture component or the liquid phase from gas by excluding effects promoting flow mixing in locations used for separating the target component.

This result is achieved due to the fact that the device used for gas liquefaction and separation or for isolating of one or several gases from their mixture comprises the following units that are arranged sequentially and coaxially: a premix chamber with a means for swirling a gas flow arranged therein, a subsonic or supersonic nozzle with a working section attached thereto, a means for separating the liquid phase being attached to the said section, a subsonic diffuser or a combination of a supersonic diffuser and a subsonic diffuser, the said nozzle being made with such relationships between the cross-sectional areas of the inlet and the outlet to the minimum cross-section of the nozzle that enable to achieve at its outlet a static pressure and a static temperature that comply with the condition of condensation of gas or of gas mixture target components. A length of the working section is selected so as to ensure formation of condensate droplets having a size greater than 0.5 microns and their drift under the action of centrifugal forces from the axial area of the working section to the walls of the droplet separation means, and the opening angle of the working section ensures maintenance of the conditions of condensation of gas or its target components, the device being provided with an additional subsonic or supersonic nozzle arranged in the premix chamber.

The said effect is also achieved due to the fact that the additional subsonic or supersonic nozzle is made so as the relationship between the outlet-cross-sectional areas of the main nozzle and the additional nozzle is equal to:

$$\frac{F_{add.nozzle.out.}}{F_{main.nozzle.out.}} \approx 0.01 - 0.5$$

The effect is also achieved due to the fact that the additional subsonic or supersonic nozzle is arranged in the premix chamber coaxially or not coaxially to the main nozzle.

The said effect is also achieved due to the fact that the additional subsonic or supersonic nozzle is arranged in the premix chamber in such a way that its inlet is located before the means for swirling a gas flow or after it, and the nozzle outlet is located only after the means for swirling a gas flow. The outlet of the additional nozzle may be located both in the premix chamber and in the subsonic or supersonic portion of the main nozzle.

The said effect is also achieved due to the fact that the additional nozzle inlet is connected to an additional gas supply source.

The said effect is also achieved due to the fact that the device is provided with a gas-liquid separator which inlet is connected to the outlet of the means for separating the liquid phase, and the gas outlet is connected to the inlet of the additional nozzle.

The said effect is also achieved due to the fact that the area of the main nozzle inlet cross-section exceeds the area of its critical (minimum) cross-section at least 10 times.

The said effect is also achieved due to the fact that a device transforming the kinetic energy of a swirling flow into pressure is installed behind the subsonic diffuser or in the subsonic diffuser. The provision of the device premix chamber with a means for swirling a gas flow is required for generating centrifugal forces in the gas flow, which act to separate condensed droplets from the main gas flow.

The use of a subsonic diffuser or a combination of a supersonic diffuser and a subsonic diffuser enables to raise the efficiency of the device, since it reduces the required pressure differential of a gas flow between the device inlet and its outlet. At this, depending on the Mach number (M) of the flow at the outlet of the working section, a pressure restoration means is made as a subsonic diffuser or a combination of a supersonic diffuser and a subsonic diffuser. Thus, if a subsonic nozzle is used as the main nozzle, then an initial section after the device for separating the liquid phase is made as a subsonic diffuser with the half angle 3-6°. If a supersonic nozzle is used as the main one, then a combination of a supersonic diffuser and a subsonic diffuser, which are installed successively downstream the device for separating the liquid phase. The type of the main nozzle—subsonic or supersonic—is selected depending on the thermodynamic parameters of a compressed gas or gas mixture (composition, pressure and temperature at the device inlet, flow rate, dew point, etc.). But in any case the main nozzle should ensure adiabatic cooling of a gas or gas mixture to a point where it or its portion, better a bigger one, is transformed into the liquid phase.

The device for separating the liquid phase can be implemented in three variants: a) as perforations in the walls of the nozzle and/or its working section at the areas where condensed droplets reach the walls due to centrifugal forces caused by the swirling flow; b) as an annular slot formed by the working section walls and the inlet section of the diffuser arranged at the working section outlet; c) as a combination of walls perforation and use of annular slot.

The device for separating the liquid phase may be used in any of the three above variants—a), b) or c)—depending on the characteristics of a gas or the composition of a gas mixture and on the gas flow velocity in the nozzle. In some cases it may be preferable to make the device for separating the liquid phase only as perforations in the walls of the nozzle and/or the working section. Depending on the thermodynamic parameters, devices for separating a liquid may be arranged at the initial section of a subsonic diffuser also.

In a case of using both perforations and an annular slot, the proposed device may be used for liquefying of multi-component gases. First, a gas-liquid mixture enriched with a component condensing at a higher temperature will be separated via perforations in the walls and/or the working section, and then a gas-liquid mixture enriched with a component condensing at a lower temperature will be separated via the annular slot.

Making the main supersonic or subsonic nozzle with such relationships between the cross-sectional areas of its inlet and outlet and the minimum cross-sectional area of the nozzle, which will ensure achieving a static pressure and a static temperature that comply with the condition of gas or its target components condensation, will enable to raise the separation efficiency by excluding effects of excessive or insufficient cooling of a gas as well as effects causing mixing a flow in the separation point of a target component.

At a high swirling degree necessary for efficient operation of the device, reverse and secondary flows arise around the axis of the premix chamber, precessing vortex formations are generated. This situation leads to flow instabilities along the installation path. Furthermore, depending on the type of swirling, it causes various vortex wakes in the flow. Thus, for example, is a vane swirler is installed, flow velocity discontinuity arises on the rear edge of the vane. The similar effect also occurs if an inflow is swirling tangentially.

Higher flow vorticity (along the flow line after each vane with higher vorticity) causes flow disturbances near the walls as well as the boundary layer, which have a negative effect on the separation process, causing mixing already separated liquid components with the gas cleared of them.

In order to reduce magnitudes of disturbances caused by said wakes after swirlers, it is advisable to use the effect that is called "effect of flow reduction" by the authors. It is determined by calculations using the Bernoulli equation and during the subsequent experimental check that at the relation $$\frac{F_1}{F_2} \approx 10-16,$$

where $F_1$ и $F_2$ are the areas of the inlet cross-section and the minimum (critical) cross-section, respectively, of the main nozzle, non-uniformities in the velocity field at the nozzle outlet are decreased more than by an order. Thus, the main nozzle made with definite relationships between the inlet and outlet cross-sectional areas and the nozzle minimum cross-section makes it possible to achieve a static pressure and a static temperature at its outlet, which comply with the condition of gas or its target component condensation, and enables to maintain a thermodynamic state necessary for creating a required number of condensation centers. In order to create a required number of condensation centers, gas should be supercooled. Therefore, the contour of the main nozzle is selected so that gas, after reaching the dew point, may additionally expand until a static temperature is reached that is 20-50° C. less that the dew point.

Higher supercooling, which is possible at a greater Mach number (M) of the flow, leads to greater losses in a total pressure, i.e., to a significantly higher pressure differential between the inlet and the outlet of the device.

The length of the nozzle working section, which ensures formation of condensed droplets having a size more than 0.5 microns and their drift from the axial area of the working section to the droplet separation device under the action of centrifugal forces, also enables to raise the separation efficiency, since selection of the working section length is determined by a droplet growth rate that depends on the medium thermodynamic parameters (temperature, partial pressure of a target component, droplet surface tension, etc.) as well as the gas-dynamic behavior of a flow, namely, its velocity, turbulence spectrum, specific distribution of pressure on the nozzle radius, etc. The length should be sufficient in order that droplets may be formed and grow to sizes greater than D>0.5 microns and may also diffuse to the working section walls at a given flow velocity determined by initial thermodynamic parameters of gas and the nozzle geometry. The time of droplet formation may be obtained from known literature sources. The drift velocity at a given degree of flow swirling may be determined by using known methods.

A half-angle of the nozzle working section, which ensures maintaining condensation conditions for gas or its target components, raises separation efficiency due to optimal relationships between the main nozzle inlet and outlet and its minimum cross-section, at which static temperatures of a flow and a partial pressure of a gas target component correspond to the conditions of maximum droplet growth rates at a minimum required pressure differential at the inlet and the outlet of the whole device. The half-angle of the nozzle working section is selected on the basis of maintaining the said conditions. Here, the growth of the boundary layer on the walls is to be considered also.

The provision of the device with the additional subsonic or supersonic nozzle and arrangement of the same in the premix chamber enable to raise the separation efficiency, since the stability of a flow raises significantly. It is known from the experiments and literature sources that a certain portion of a vortex flow, which is near the device axis, is unstable and precesses relative to the device axis, thus leading to flow disturbances and adversely influencing the separation process. Blowing of a non-eddying jet into the flow central area enables, for example, to stabilize the flow, thus excluding the precession effect.

A position of jet blowing from the additional nozzle to the main flow (i.e., the premix chamber, the subsonic or supersonic portion of the main nozzle) depends on the swirling intensity, the thermodynamic parameters of the flows in the main nozzle and the additional nozzle and the relationship between flow rates in them.

Making the additional nozzle so as the relationship of the outlet cross-sections between the additional nozzle and the main nozzle is 0.01-0.5 enables to optimize the target component separation condition. The selection of the said geometric dimensions is based on experimental relations. Thus, if the said relationship is less than 0.01, the separation efficiency is reduced, since in such a case the effect of stable flow axis position does not appear. Also, if this relationship is greater than 0.5, the separation efficiency is also reduced because the vortex intensity and centrifugal forces, and, consequently, the separation effect, are lowered at such intensity of gas supply into the vortex core.

The additional subsonic or supersonic nozzle in some embodiments may be arranged in the premix chamber coaxially or not coaxially to the main nozzle. In a case of the coaxial arrangement the separation is more effective due to stabilization of the flow axis position. Non-coaxial arrangement of the additional nozzle provides the possibility of acting better on instability of a vortex flow.

The additional nozzle may be arranged in the premix chamber differently. In one embodiment its inlet may be located before the means for swirling a gas flow. In another embodiment the inlet may be located after the means for swirling a gas flow.

In both embodiments the outlet of the additional nozzle may be located after the means for swirling a gas flow only. In a case where the additional nozzle inlet is located before the swirling device and the outlet is located after the swirling device, an noneddying gas jet is supplied into a swirling flow, which stabilizes the vortex flow.

This case corresponds, as a rule, to the case where intensive initial swirling is used. If less intensive initial swirling is used, then the use of already swirling jet may be more beneficial for stabilizing a flow. In such a case the additional nozzle inlet is located after the swirling device.

The outlet of the additional nozzle may be both in the premix chamber and in the subsonic or supersonic portion of the main nozzle.

A connection between the additional nozzle inlet and an additional gas source may raise the separation efficiency, since in such a case a higher total pressure and, correspondingly, a more dense jet at a higher velocity may be used, which, when necessary, ensures better stabilization of a flow.

Provision of the gas liquefaction and separation device with a gas-liquid separator which inlet is connected to the outlet of a means for separating the liquid phase and its gas outlet is connected to the inlet of the additional nozzle raises the separation efficiency due to the fact that a gas from the gas-liquid separator, which has a separated component with a high concentration on one side and a lower temperature on the other side, enters the central part of the vortex area, which promotes the formation of clusters being nuclei of droplets in the gas. A higher concentration of a target separated component in the gas entering the additional nozzle is conditioned by the fact that the thermodynamic equilibrium and the gas-liquid phase equilibrium exist in the gas-liquid separator. Here, the liquid contains mainly the target component. A lower temperature of the gas entering the additional nozzle is conditioned, mainly, by the Joule-Thomson effect that occurs during gas expansion in the main nozzle, since a pressure in the means for separating a component is lower than at the inlet of the main nozzle.

In order a gas may enter into the additional nozzle inlet from the gas-liquid separator, it is necessary that a pressure at the additional nozzle outlet is less than a static pressure in a swirling flow at the outlet location. It is reached, for example, by selecting swirling intensity. That is, such swirling intensity may always be selected that a pressure at the flow axis in the area of the nozzle outlet will be sufficiently low in order a pressure differential may be created that is required for supplying a gas back into the flow from the gas-liquid separator.

The proposed structure has a significant advantage over the known ones, since it enables to solve the problem of liquid carry-over when preparing a gas for transportation in the gas industry. For example, according to the common methods of isolating a condensed component with the use of a turboexpander or a throttle, all gas, which is cooled in such devices, enters into a gas-liquid separator where the two-phase flow is divided into a gas and a liquid. The gas flow comes to a pipeline, but this gas, which is prepared for transportation, still contains some quantity of a liquid component due to incomplete division of the two-phase flow. This leads to serious problems during gas transportation. A similar problem arises in a case where a gas is prepared for transportation with the use of a supersonic separator (see, e.g., RU Patent No. 2137065, RU Patent No. 2167374). In such a case a treated gas flow from a supersonic separator, before being supplied to a pipeline, is combined with a gas flow from a gas-liquid separator where an enriched gas-liquid flow from the supersonic separator is divided into the gas phase and the liquid phase. This problem is solved by the proposed structure, since only a treated gas flow from the supersonic separator is fed to a pipeline, and the gas flow from the gas-liquid separator is returned to the inlet of the proposed device.

Making the inlet cross-sectional area of the main nozzle at least 10 times greater than its minimum (critical) cross-section is necessary in order to reduce existing non-uniformities at the main nozzle inlet significantly. Such non-uniformities arise due to swirling devices arranged in the premix chamber, external turbulence, various devices, e.g., valves, gates, etc., installed in the gas transportation route. The "reduction effect" enables to decrease the flow non-uniformity significantly and, consequently, decrease the flow mixing that adversely acts on the process of droplet separation.

In particular embodiments it is advisable to install after or in a subsonic diffuser a device that transforms the kinetic energy of a swirling flow into pressure, since a significant part of the kinetic energy of a swirling flow is contained in its tangential components. Only the velocity component is transferred to the pressure energy in a device comprising a combination of a supersonic diffuser and a subsonic diffuser, therefore, the use of straighteners is desirable. Several types of straighteners are known. Some of them simply dissipate the tangential velocity component (for example, grids, honeycombs, etc.), the other ones transform the tangential velocity component into pressure. One example of the latter is a straightener made in the form of a central body having vanes arranged thereon and oriented correspondingly. And devices of this type should be installed for the purpose of raising the device efficiency. The provision of a diffuser with a means for straightening a swirling gas flow enables to transform the kinetic energy of its swirling motion into the energy of translational motion, which results in a pressure increase at the device outlet and, consequently, decreases a pressure differential between the inlet and the outlet, thus also raising the device efficiency.

The essence of the claimed gas liquefaction and separation device will be further explained by reference to its embodiments and the appended drawings.

FIG. 1 schematically shows a longitudinal cross-section of the device according to claim 1, comprising: an additional supersonic nozzle arranged coaxially, its inlet being arranged upstream the device for swirling a gas flow and its outlet being arranged in the subsonic portion of the main nozzle, a working section and a system of a supersonic diffuser and a subsonic diffuser.

Figure 2:
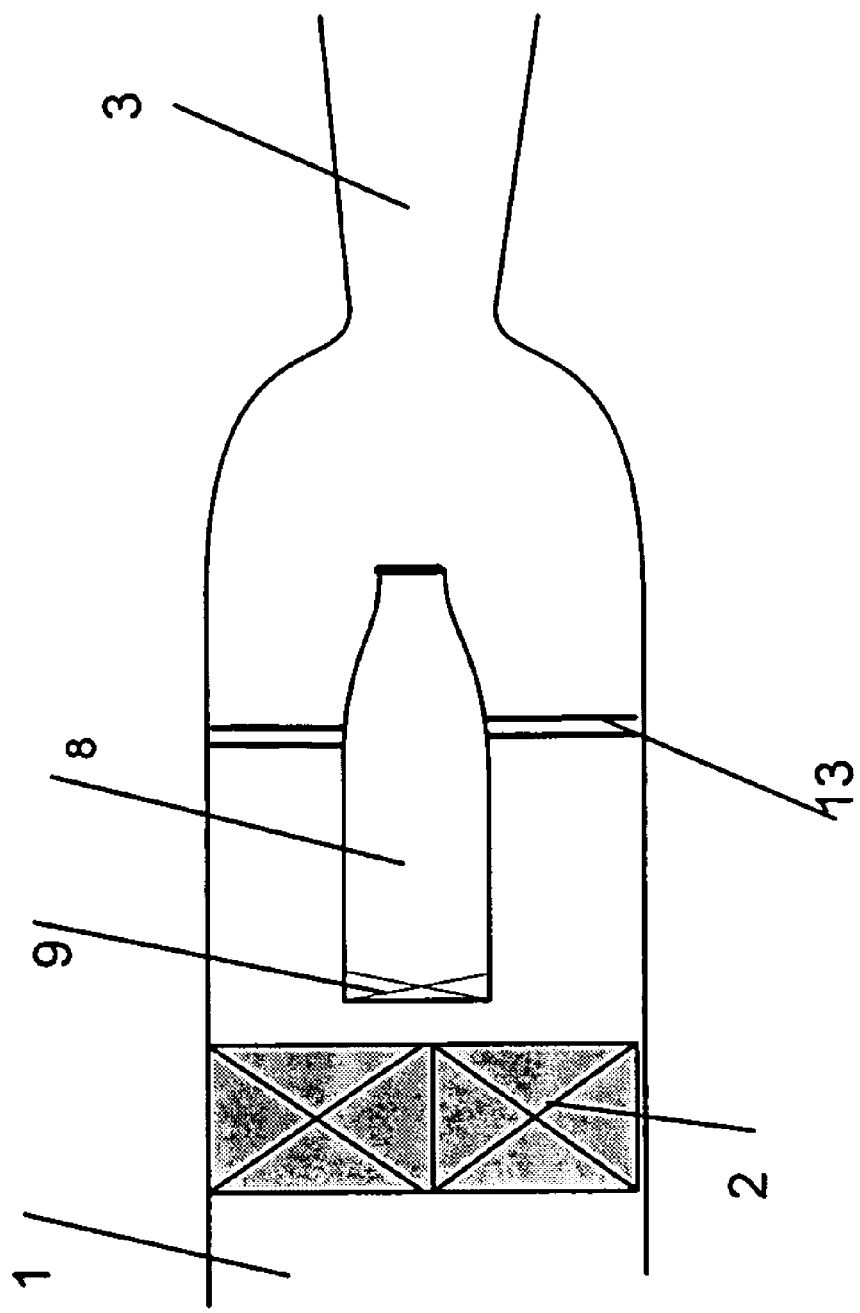

FIG. 2 schematically shows a longitudinal cross-section of the device premix chamber, the additional subsonic nozzle inlet being arranged downstream the device for swirling a gas flow and the outlet being arranged in the premix chamber.

Figure 3:
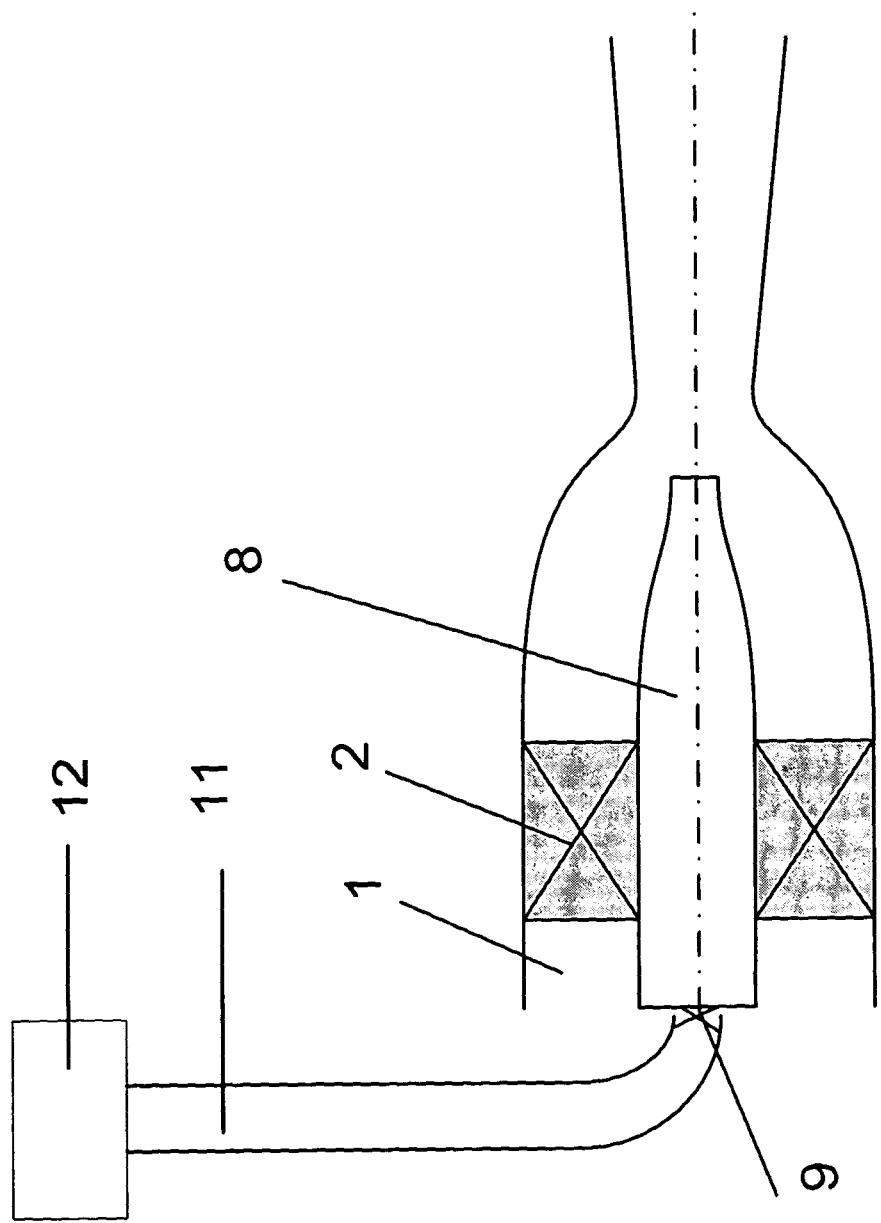

FIG. 3 shows a longitudinal cross-section of the premix chamber of a device having an additional subsonic nozzle which inlet is connected to an external gas source and its outlet is in the subsonic portion of the main nozzle.

Figure 4:
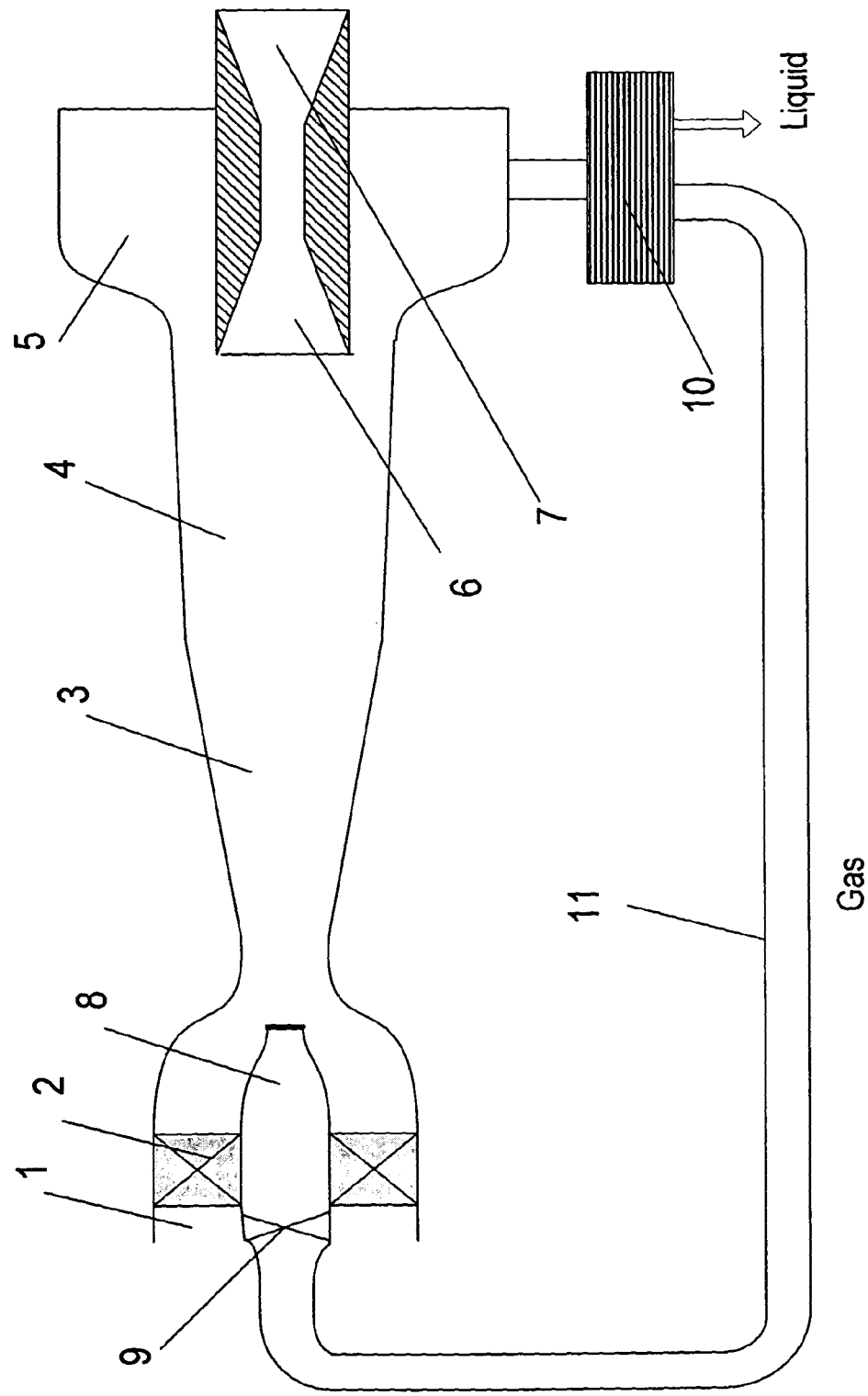

FIG. 4 schematically shows a longitudinal cross-section of the device provided with an additional gas source in the form of a gas-liquid separator which gas outlet is connected to the inlet of an additional subsonic nozzle, the latter's outlet being in the subsonic portion of the main nozzle.

Figure 5:
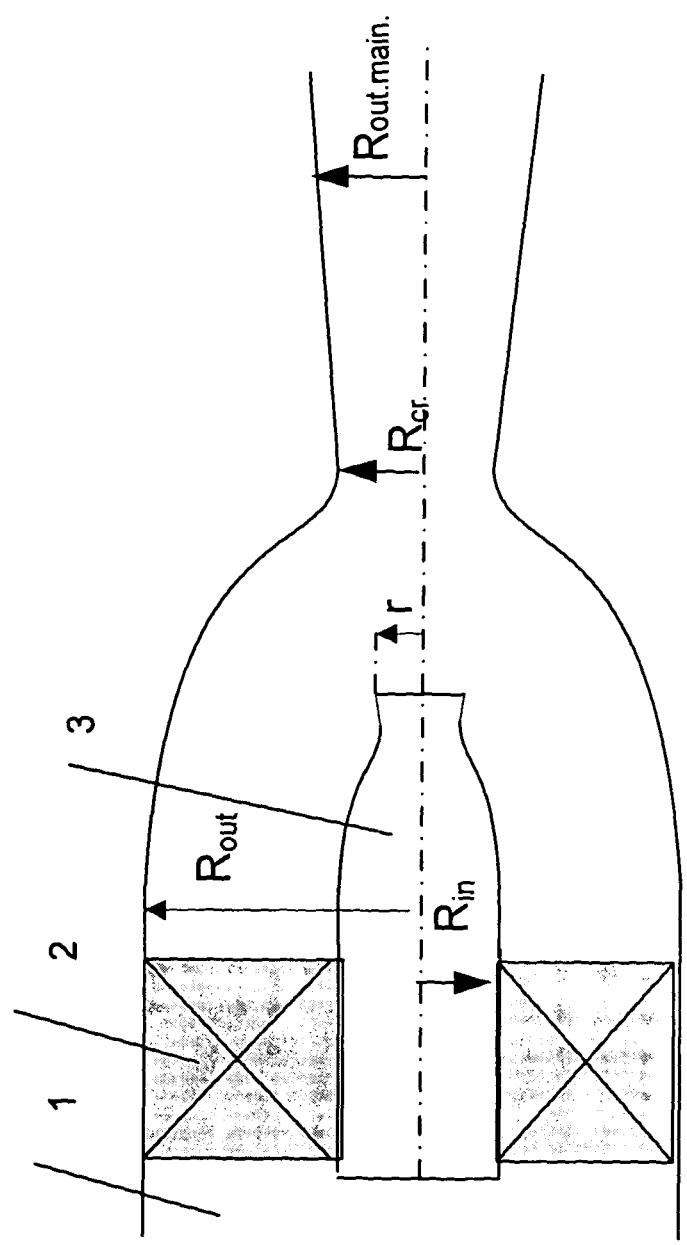

FIG. 5 shows a longitudinal cross-section of the device having geometrical relationships of typical dimensions, which ensure dumping flow pulses arising due to swirling devices and other elements of a pipeline.

Figure 6:
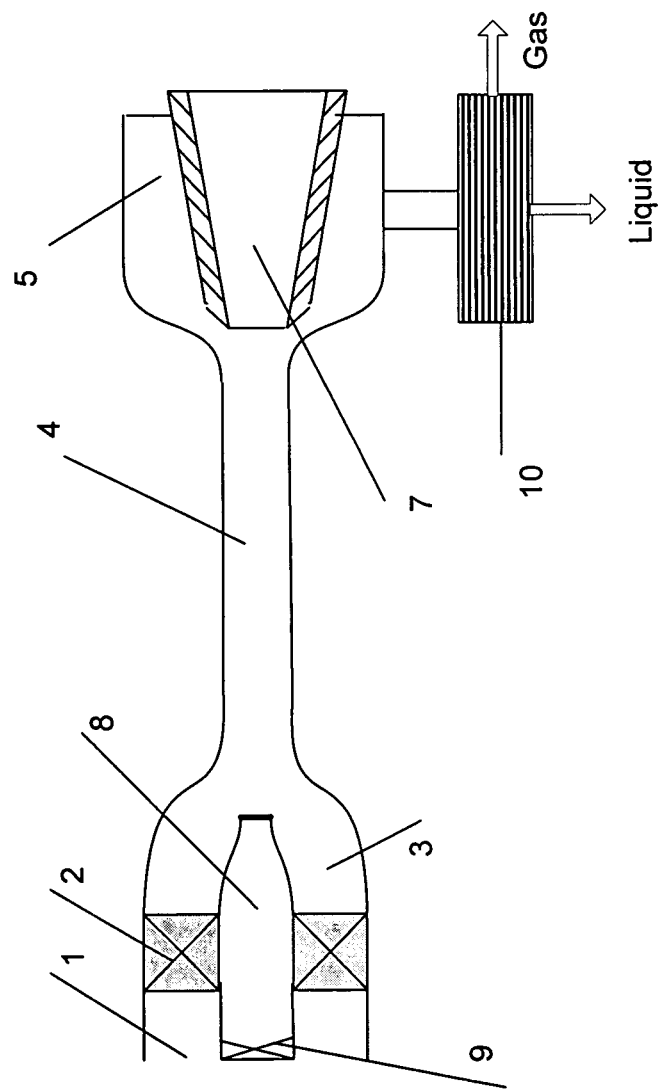

FIG. 6 schematically shows a longitudinal cross-section of the device, which is characterized in claim 1, comprising an additional subsonic nozzle arranged coaxially wherein the nozzle inlet is arranged upstream a means for swirling a gas flow and the nozzle outlet is arranged in the subsonic portion of the main nozzle, and a subsonic diffuser.

EXAMPLE 1

One embodiment of the gas liquefaction and separation device, as shown in FIG. 1, comprises the following components installed successively and coaxially: the premix chamber 1 with the means 2 for swirling a gas flow, the supersonic nozzle 3 with the working section 4 attached thereto, the means 5 for separating the liquid phase being attached to the working section. The supersonic diffuser 6 and the subsonic diffuser 7 are arranged at the outlet of the nozzle 3 downstream the working section 4. The additional supersonic nozzle 8 is arranged in the premix chamber 1 of the device, the inlet of the nozzle being provided with the device 9 for regulating gas flow rate in the additional nozzle. The additional nozzle inlet is upstream the means 2 for swirling a gas flow, and the outlet is in the subsonic portion of the main nozzle. This structural arrangement is used, as a rule, for intensive initial swirling. The means 5 for separating the liquid phase is connected to the gas-liquid separator 10. The claimed device is operated as follows.

A gas mixture is fed into the premix chamber 1, its main portion going through the swirling device 2 and the remaining portion going to the inlet of the additional nozzle 8 (its flow rate is regulated by the device 9). The swirling flow enters the main nozzle 3 where it expands adiabatically, its pressure and temperature being decreased. The characteristics of the nozzle 3 (relationship between the inlet and outlet cross-sectional areas and the minimum cross-section area) are selected, on the basis of calculations, so as to reach a static pressure and a static temperature at its outlet, which comply with the condition of the target component condensation, with due regard to required supercooling (for the purpose of creating a required quantity of condensation centers).

In such a case it is necessary that, for the purpose of reducing flow non-uniformities arising at the main nozzle inlet, the following relationship is met:

$$\frac{R_{out}^2 - R_{in}^2}{R_{cr}^2} \geq 10,$$

which corresponds to claim 9 (see FIG. 5).

Then, the swirling flow enters the working section 4, which length is selected on the basis of the conditions that enable droplets to grow to sizes greater than 0.5 microns and drift under the action of centrifugal forces toward its walls. The aperture angle of the working section is determined both by calculations and experimentally, and is selected so as to maintain conditions for maximum growth of droplets and to compensate for a growth of the boundary layer.

Directing a flow portion in the form of a non-swirling jet through the additional nozzle stabilizes the vortex flow and maintains the process stability in the device, thus contributing to the latter's efficiency.

The selection of a subsonic or supersonic additional nozzle is determined by swirling intensity and a related pressure differential between the additional nozzle inlet and outlet. At high swirling intensity a supersonic nozzle is preferable, and at low swirling intensity a subsonic nozzle is preferable. Here, the following relationship should be complied with:

$$\frac{Fadd.nozzle.out.}{Fmain.nozzle.out.} \approx 0.01 - 0.5,$$

which corresponds to claim 2, at Fadd.nozzle.out=$\pi r^2$ and Fmain.nozzle.out=$\pi R^2$ (see FIG. 5).

The gas-liquid flow, which is formed near the working section walls and is enriched with a target component, goes to the separation means 5 and further to the gas-liquid separator 10, and the gas mixture without the target component leaves the device, passing through the supersonic diffuser 6 and the subsonic diffuser 7.

In this Example the main supersonic nozzle 3 is used. Therefore, in order to stagnate the flow and transform its kinetic energy into pressure, the flow successively passes through the supersonic diffuser and the subsonic diffuser. The flow is stagnated in the shock wave system to a sound velocity in the first diffuser and to a velocity required for further transportation of the gas in the second diffuser. The selection of geometric parameters for the diffusers (their inlet and outlet cross-sections, their aperture angles) is determined by the condition of maximum efficiency of transforming the flow kinetic energy into the pressure energy.

Thus, due to the device operation, the gas mixture is divided into two flows in it. One flow is a gas flow cleared from the target component, and the other flow is a gas-liquid flow that is directed, for example, into the gas-liquid separator 10 where it is divided into the gas phase and the liquid phase. The gas flow from the gas-liquid separator may be combined with the gas flow from the device or may be directed to the device inlet, as described in Example 4.

EXAMPLE 2

Another embodiment of the gas liquefaction and separation device, as shown in FIG. 2 (only the cross-section of the premix chamber is shown, the other elements are as in FIG. 1) comprises the following components installed successively and coaxially: the premix chamber 1 with the means 2 for swirling a gas flow, the supersonic nozzle 3 with the working section 4 attached thereto, the means 5 for separating the liquid phase being attached to the working section. The supersonic diffuser 6 and the subsonic diffuser 7 are arranged at the outlet of the nozzle 3 downstream the working section 4. The additional supersonic nozzle 8 is arranged in the premix chamber 1 of the device with the use of pillars 13, the inlet of the nozzle being provided with the device 9 for regulating gas flow rate in the additional nozzle. The additional nozzle inlet is downstream the means 2 for swirling a gas flow. This structural arrangement is used, as a rule, for relatively weak initial swirling. The device is operated as follows.

A gas mixture is fed into the premix chamber 1, its main portion going through the swirling device 2 and the remaining portion going to the inlet of the additional nozzle 8 (its flow rate is regulated by the device 9). The swirling flow enters the main nozzle 3 where it expands adiabatically, its pressure and temperature being decreased. The characteristics of the nozzle 3 (relationship between the inlet and outlet cross-sectional areas and the minimum cross-section area) are selected, on the basis of calculations, so as to reach a static pressure and a static temperature at its outlet, which comply with the condition of the target component condensation, with due regard to required supercooling (for the purpose of creating a required quantity of condensation centers). Then, the swirling flow enters the working section 4, which length is selected on the basis of the conditions that enable droplets to grow to sizes greater than 0.5 microns and drift under the action of centrifugal forces toward its walls. The aperture angle of the working section is determined both by calculations and experimentally, and is selected so as to maintain conditions for maximum growth of droplets and compensate for a growth of the boundary layer.

Directing a flow portion in the form of a non-swirling jet through the additional nozzle stabilizes the vortex flow and maintains the process stability in the device, thus contributing to the latter's efficiency.

In this case the selection of a subsonic additional nozzle is determined by weak efficiency of swirling.

The gas-liquid flow, which is formed near the working section walls and is enriched with a target component, enters into the separation means 5 and further to the gas-liquid separator 10, and the gas mixture without the target component leaves the device, passing through the supersonic diffuser 6 and the subsonic diffuser 7.

In this Example the main supersonic nozzle 3 is used. Therefore, in order to stagnate the flow and transform its kinetic energy into pressure, the flow successively passes through the supersonic diffuser and the subsonic diffuser. The flow is stagnated in the shock wave system to a sound velocity in the first diffuser and to a velocity required for further transportation of the gas in the second diffuser. The selection of geometric parameters for the diffusers (their inlet and outlet cross-sections, their aperture angles) is determined by the condition of maximum efficiency of transforming the flow kinetic energy into the pressure energy.

Thus, due to the device operation, the gas mixture is divided into two flows in it. One flow is a gas flow enriched with the target component, and the other flow is a gas flow without that target component.

EXAMPLE 3

Still another embodiment of the gas liquefaction and separation device, as shown in FIG. 3 (only the cross-section of the premix chamber and the external gas source are shown, the other elements are as in FIG. 1) comprises the following components installed successively and coaxially: the premix chamber 1 with the means 2 for swirling a gas flow, the supersonic nozzle 3 with the working section 4 attached thereto, the means 5 for separating the liquid phase being attached to the working section. The supersonic diffuser 6 and the subsonic diffuser 7 are arranged at the outlet of the nozzle 3 downstream the working section 4. The additional subsonic nozzle 8 is arranged in the premix chamber 1 of the device, the inlet of the nozzle being provided with the device 9 for regulating gas flow rate in the additional nozzle. The additional nozzle inlet is connected by the pipeline 11 to the external gas source 12 which may be any known source. For example, this may be the outlet of any apparatus used for treating gas mixtures, a gas or gas-condensate well, etc. In this case the additional nozzle inlet is located upstream the means 2 for swirling a gas flow.

The device is operated as follows.

A gas mixture is fed into the premix chamber 1 and is passed through the swirling device 2. Another gas flow from the external source 12 enters into the inlet of the additional nozzle 8 through the pipeline 11 (the flow rate is regulated by the device 9). The swirling flow enters the main nozzle 3 where it expands adiabatically, its pressure and temperature being decreased. The characteristics of the nozzle 3 (relationship between the inlet and outlet cross-sectional areas and the minimum cross-section area) are selected, on the basis of calculations, so as to reach a static pressure and a static temperature at its outlet, which comply with the condition of the target component condensation, with due regard to required supercooling (for the purpose of creating a required quantity of condensation centers). Then, the swirling flow enters the working section 4, which length is selected on the basis of the conditions that enable droplets to grow to sizes greater than 0.5 microns and drift under the action of centrifugal forces toward its walls. The aperture angle of the working section is determined both by calculations and experimentally, and is selected so as to maintain conditions for maximum growth of droplets and compensate for a growth of the boundary layer.

Directing a gas flow in the form of a non-swirling jet through the additional nozzle stabilizes the vortex flow and maintains the process stability in the device, thus contributing to the latter's efficiency. The gas from the additional source may contain some quantity of the liquid component which droplets act as nuclei, thus contributing to the condensation process and raising the device efficiency.

The gas-liquid flow, which is formed near the working section walls and is enriched with a target component, enters into the separation means 5 and further to the gas-liquid separator 10, and the gas mixture without the target component leaves the device, passing through the supersonic diffuser 6 and the subsonic diffuser 7.

In this Example the main supersonic nozzle 3 is used. Therefore, in order to stagnate the flow and transform its kinetic energy into pressure, the flow successively passes through the supersonic diffuser and the subsonic diffuser. The flow is stagnated in the shock wave system to a sound velocity in the first diffuser and to a velocity required for further transportation of the gas in the second diffuser. The selection of geometric parameters for the diffusers (their inlet and outlet cross-sections; their aperture angles) is determined by the condition of maximum efficiency of transforming the flow kinetic energy into the pressure energy.

Thus, due to the device operation, the gas mixture is divided into two flows in it. One flow is a gas flow enriched with the target component, and the other flow is a gas flow without that target component, which is passed to, for example, the gas-liquid separator 10 where it is divided into the gas phase and the liquid phase. The gas flow from the gas-liquid separator may be combined with the gas flow from the device or directed to the device inlet, as described in Example 4.

EXAMPLE 4

Still another embodiment of the gas liquefaction and separation device, as shown in FIG. 4, comprises the following components installed successively and coaxially: the premix chamber 1 with the means 2 for swirling a gas flow, the supersonic nozzle 3 with the working section 4 attached thereto, the means 5 for separating the liquid phase being attached to the working section. The supersonic diffuser 6 and the subsonic diffuser 7 are arranged at the outlet of the nozzle 3 downstream the working section 4. The additional subsonic or supersonic nozzle 8 is arranged in the premix chamber 1 of the device, the inlet of the nozzle being provided with the device 9 for regulating gas flow rate in the additional nozzle. The additional nozzle inlet is connected by the pipeline 11 to the external gas source 12 being the gas outlet of the gas-liquid separator 10. In this case the additional nozzle inlet is located upstream the means 2 for swirling a gas flow.

The device is operated as follows.

A gas mixture is fed into the premix chamber 1, its main portion going through the swirling device 2 and the remaining portion going to the inlet of the additional nozzle 8 (its flow rate is regulated by the device 9). The swirling flow enters the main nozzle 3 where it expands adiabatically, its pressure and temperature being decreased. The characteristics of the nozzle 3 (relationship between the inlet and outlet cross-sectional areas and the minimum cross-section area) are selected, on the basis of calculations, so as to reach a static pressure and a static temperature at its outlet, which comply with the condition of the target component condensation, with due regard to required supercooling (for the purpose of creating a required quantity of condensation centers). Then, the swirling flow enters the working section 4, which length is selected on the basis of the conditions that enable droplets to grow to sizes greater than 0.5 microns and drift under the action of centrifugal forces toward its walls. The aperture angle of the working section is determined both by calculations and experimentally, and is selected so as to maintain conditions for maximum growth of droplets and compensate for a growth of the boundary layer.

The gas-liquid flow, which is formed near the working section walls and is enriched with a target component, enters into the separation means 5 and further to the gas-liquid separator 10, and the gas mixture without the target component leaves the device, passing through the supersonic diffuser 6 and the subsonic diffuser 7.

The gas from the gas-liquid separator 10 enters into the inlet of the additional nozzle 8 via the pipeline 11. Its flow rate is regulated by the device 9.

Directing a gas flow from the gas-liquid separator to the additional nozzle inlet can solve two tasks. First, as in the above Examples, non-swirling jet from the additional nozzle stabilizes the vortex flow and maintains the process stability in the device. Second, since the gas from the gas-liquid separator always contains some quantity of a liquid, directing it to a pipeline may result in problems during further transportation. The proposed solution enables to reduce the quantity of a liquid in the treated gas, thus contributing to raising the efficiency of the claimed device.

In this Example the main supersonic nozzle 3 is used. Therefore, in order to stagnate the flow and transform its kinetic energy into pressure, the flow successively passes through the supersonic diffuser and the subsonic diffuser. The flow is stagnated in the shock wave system to a sound velocity in the first diffuser and to a velocity required for further transportation of the gas in the second diffuser. The selection of geometric parameters for the diffusers (their inlet and outlet cross-sections, their aperture angles) is determined by the condition of maximum efficiency of transforming the flow kinetic energy into the pressure energy.

Thus, due to the device operation, the gas mixture is divided into two flows in it. One is a gas flow prepared for transportation, and the other one is a liquid flow.

EXAMPLE 5

Still another embodiment of the gas liquefaction and separation device, as shown in FIG. 6, comprises the following components installed successively and coaxially: the premix chamber 1 with the means 2 for swirling a gas flow, the subsonic nozzle 3 with the working section 4 attached thereto, the means 5 for separating the liquid phase being attached to the working section. The subsonic diffuser 7 is arranged at the outlet of the nozzle 3 downstream the working section 4. The additional subsonic nozzle 8 is arranged in the premix chamber 1 of the device, the inlet of the nozzle being provided with the device 9 for regulating gas flow rate in the additional nozzle.

In this case the additional nozzle inlet is located upstream the means 2 for swirling a gas flow, and its outlet is arranged in the subsonic main nozzle. The means 5 for separating the liquid phase is connected to the gas-liquid separator 10.

The device is operated as follows.

A gas mixture is fed into the premix chamber 1, its main portion going through the swirling device 2 and the remaining portion going to the inlet of the additional nozzle 8 (the flow rate is regulated by the device 9). The swirling flow enters the main nozzle 3 where it expands adiabatically, its pressure and temperature being decreased. The characteristics of the subsonic nozzle 3 (relationship between the inlet cross-sectional area and the minimum cross-section area) are selected, on the basis of calculations, so as to reach a static pressure and a static temperature at the inlet of the working section 4, which comply with the condition of the target component condensation, with due regard to required supercooling (for the purpose of creating a required quantity of condensation centers). Then, the swirling flow enters the working section 4, which length is selected on the basis of the conditions that enable droplets to grow to sizes greater than 0.5 microns and drift under the action of centrifugal forces toward its walls.

Directing a portion of the gas flow in the form of a non-swirling jet through the additional nozzle stabilizes the vortex flow and maintains the process stability in the device, thus contributing to the latter's efficiency.

In this case the selection of a subsonic additional nozzle is determined by weak swirling intensity.

The gas-liquid flow, which is formed near the working section walls and is enriched with a target component, enters into the separation means 5 and further to the gas-liquid separator 10, and the gas mixture without the target component leaves the device, passing through the subsonic diffuser 7.

In this Example the main subsonic nozzle 3 is used. Therefore, in order to stagnate the flow and transform its kinetic energy into pressure, the flow passes through the subsonic diffuser 7. The flow velocity is reduced in this diffuser to a velocity required for further transportation of the gas.

The selection of geometric parameters for the diffuser (its inlet and outlet cross-sections, its aperture angle) is determined by the condition of maximum efficiency of transforming the flow kinetic energy into the pressure energy.

Thus, due to the device operation, the gas mixture is divided into two flows in it. One flow is a gas flow cleared from the target component, and the other flow is a gas-liquid flow enriched with that target component, which is passed to, for example, the gas-liquid separator 10 where it is divided into the gas phase and the liquid phase. The gas flow from the gas-liquid separator may be combined with the gas flow from the device or directed to the device inlet, as described in Example 4.

What is claimed is:

1. A device for gas liquefaction or separation of one or more gases from their mixture, comprising the following coaxially installed components: a premix chamber (1) with swirling means (2) for swirling a gas flow; a main subsonic or supersonic nozzle (3) with a working section (4) attached thereto, separating means (5) for separating the liquid phase being attached to the working section, a subsonic diffuser (7) or a combination of a supersonic diffuser (6) and a subsonic diffuser (7); the device being arranged such that the nozzle (3) being made with relationships between inlet and outlet cross-sectional areas and minimum cross section of the nozzle (3) that ensure a static pressure and a static temperature at the nozzle outlet, which comply with the condition of condensation of a gas or the gas' target components, a length of the working section (4) ensures formation of condensate droplets having a size greater than 0.5 microns and their drift from the axial area of the working section (4) toward the walls of droplet separating means for separating droplets, and the aperture angle of the working section (4) ensures maintaining conditions for gas or the gas' target component condensation; the said device being provided with an additional subsonic or supersonic nozzle (8) arranged in the premix chamber (1), such that the outlet of the additional nozzle (8) is arranged in the subsonic portion or in the supersonic portion of the main nozzle (3).

2. A device according to claim 1, characterized in that the additional subsonic or supersonic nozzle (8) is made so as the relationship between the outlet cross-sectional areas of the main nozzle and the additional nozzle is:

$$\frac{F_{add.nozzle.out.}}{F_{main.nozzle.out.}} \approx 0.01 - 0.5.$$

3. A device according to claim 1, characterized in that the additional subsonic or supersonic nozzle (8) is arranged in the premix chamber (1) coaxially or not coaxially to the main nozzle (3).

4. A device according to claim 1, characterized in that the additional subsonic or supersonic nozzle (8) is arranged in the premix chamber (1) in such a way that the additional nozzle's inlet is located upstream the swirling means (2) for swirling a gas flow and the outlet of the additional nozzle (8) is located only downstream the swirling means (2) for swirling a gas flow.

5. A device according to claim 4, characterized in that the outlet of the additional nozzle is arranged in the premix chamber.

6. A device according to claim 1, characterized in that the inlet of the additional nozzle (8) is connected to an external gas source (12).

7. A device according to claim 1, characterized in that the device is provided with a gas-liquid separator (10) which inlet is connected to the outlet of the droplet separating means for separating the liquid phase, and the gas outlet is connected to the inlet of the additional nozzle (8).

8. A device according to claim 1, characterized in that the cross-sectional area of the main nozzle (3) is greater than the main nozzle's minimum (critical) cross-section by at least 10 times.

* * * * *